US010677050B2

(12) United States Patent
Johnston et al.

(10) Patent No.: US 10,677,050 B2
(45) Date of Patent: Jun. 9, 2020

(54) DISPERSION-SHIFTED OPTICAL FIBERS FOR DOWNHOLE SENSING

(71) Applicants: William Albert Johnston, Houston, TX (US); Paul Francis Wysocki, Blacksburg, VA (US)

(72) Inventors: William Albert Johnston, Houston, TX (US); Paul Francis Wysocki, Blacksburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/596,504

(22) Filed: May 16, 2017

(65) Prior Publication Data

US 2018/0334900 A1 Nov. 22, 2018

(51) Int. Cl.
*E21B 47/12* (2012.01)
*G02B 6/036* (2006.01)
*G01N 21/00* (2006.01)
*G02B 6/02* (2006.01)

(52) U.S. Cl.
CPC ........... *E21B 47/123* (2013.01); *G01N 21/00* (2013.01); *G02B 6/02228* (2013.01); *G02B 6/03627* (2013.01); *G02B 6/03666* (2013.01)

(58) Field of Classification Search
CPC .... E21B 47/123; G01N 21/00; G02B 6/02228
See application file for complete search history.

(56) References Cited

U.S. PATENT DOCUMENTS

| 5,721,800 | A | * | 2/1998 | Kato | G02B 6/02009 |
| | | | | | 385/127 |
| 5,732,178 | A | | 3/1998 | Terasawa et al. | |
| 5,852,701 | A | | 12/1998 | Kato et al. | |
| 2003/0044146 | A1 | | 3/2003 | Okuno et al. | |
| 2007/0116416 | A1 | | 5/2007 | Chen et al. | |
| 2015/0063418 | A1 | | 3/2015 | Wysocki et al. | |
| 2017/0093493 | A1 | * | 3/2017 | Therrien | H04B 10/2519 |

OTHER PUBLICATIONS

PCT International Search Report; International Application No. PCT/US2018/027550; International Filing Date: Apr. 13, 2018; dated Jul. 31, 2018; 5 pages.
PCT Written Opinion; International Application No. PCT/US2018/027550; International Filing Date: Apr. 13, 2018; dated Jul. 31, 2018; 11 pages.

* cited by examiner

*Primary Examiner* — Hugh Maupin
(74) *Attorney, Agent, or Firm* — Cantor Colburn LLP

(57) ABSTRACT

An embodiment of a system for performing measurements in a downhole environment includes an optical interrogation assembly configured to emit a pulsed optical signal, the pulsed optical signal including a selected wavelength, and an optical fiber configured to be disposed in a borehole in an earth formation and configured to receive the pulsed optical signal, the optical fiber having at least one measurement location disposed therein and configured to at least partially reflect the pulsed optical signal. The optical fiber has a core and a cladding, at least a portion of the core made from at least substantially pure silica, and the optical fiber has a refractive index profile configured to have a zero dispersion wavelength that is greater than the selected wavelength.

20 Claims, 3 Drawing Sheets

DISPERSION-SHIFTED OPTICAL FIBERS FOR DOWNHOLE SENSING

BACKGROUND

Optical fiber sensors are often utilized to obtain various surface and downhole measurements, such as pressure, temperature, stress and strain. Examples of optical fiber sensing systems include distribute sensing systems that utilize Rayleigh backscatter to measure downhole parameters, e.g., temperature and strain. One application of optical fiber sensors in downhole environments is distributed acoustic sensing (DAS). In DAS, spatial changes in optical signals scattered by an optical fiber are caused by the impingement of acoustic waves hitting the fiber and are detected by an interrogator capable of recognizing the changes based on scattered optical signals and deducing the acoustic signals.

Single mode optical fibers are often used in downhole environments for, e.g., communication and measurement of parameters of a downhole environment (e.g., parameters of a formation, a borehole, borehole fluid and/or parameters of downhole components). Many characteristics of the particular fiber used can affect the quality or ability to measure a desired parameter, including but not limited to the mode size, optical loss in the fiber, and dispersion of the fiber (which causes a spreading of optical pulses in time). Challenges involved in performing downhole measurements include limits on optical signal power due to non-linear effects that can occur at higher powers and compromise the effectiveness of such measurements.

SUMMARY

An embodiment of a system for performing measurements in a downhole environment includes an optical interrogation assembly configured to emit a pulsed optical signal, the pulsed optical signal including a selected wavelength, and an optical fiber configured to be disposed in a borehole in an earth formation and configured to receive the pulsed optical signal, the optical fiber having at least one measurement location disposed therein and configured to at least partially reflect the pulsed optical signal. The optical fiber has a core and a cladding, at least a portion of the core made from at least substantially pure silica, and the optical fiber has a refractive index profile configured to have a zero dispersion wavelength that is greater than the selected wavelength.

An embodiment of a method of performing measurements in a downhole environment includes disposing at least a length of an optical fiber in a borehole in an earth formation, the optical fiber having at least one measurement location disposed therein and configured to at least partially reflect an optical signal having a selected wavelength. The optical fiber has a core and a cladding, at least a portion of the core made from at least substantially pure silica, and the optical fiber has a refractive index profile configured to have a zero dispersion wavelength that is greater than the selected wavelength. The method also includes transmitting a pulsed optical signal into the optical fiber, the pulsed optical signal including the selected wavelength, detecting a return signal due to Rayleigh scattering in the optical fiber, and estimating a parameter of the downhole environment based on the return signal.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Systems and methods for performing downhole parameter measurements are provided. An embodiment of a system includes an optical fiber sensor assembly configured to be disposed in a downhole location. The optical fiber sensor assembly may include a single-mode, pure-silica-core optical fiber, an electromagnetic source (e.g., tunable laser) configured to launch optical signals into the optical fiber, and a detector for detecting reflected signals from the optical fiber, which can be analyzed to estimate properties or parameters of a downhole environment. In one embodiment, the optical fiber has an index profile including an inner region made of substantially pure silica and at least one outer region having a reduced index of refraction relative to the inner region. The index profile is configured to shift dispersion characteristics, e.g., to shift the wavelength at which a zero magnitude chromatic dispersion occurs (i.e., the wavelength at which dispersion is at least substantially zero. This shift in the zero dispersion wavelength allows for increased optical signal power while reducing or eliminating non-linear effects such as modulation instability, thereby allowing for higher signal-to-noise ratios than conventional single mode optical fibers.

Figure 1:
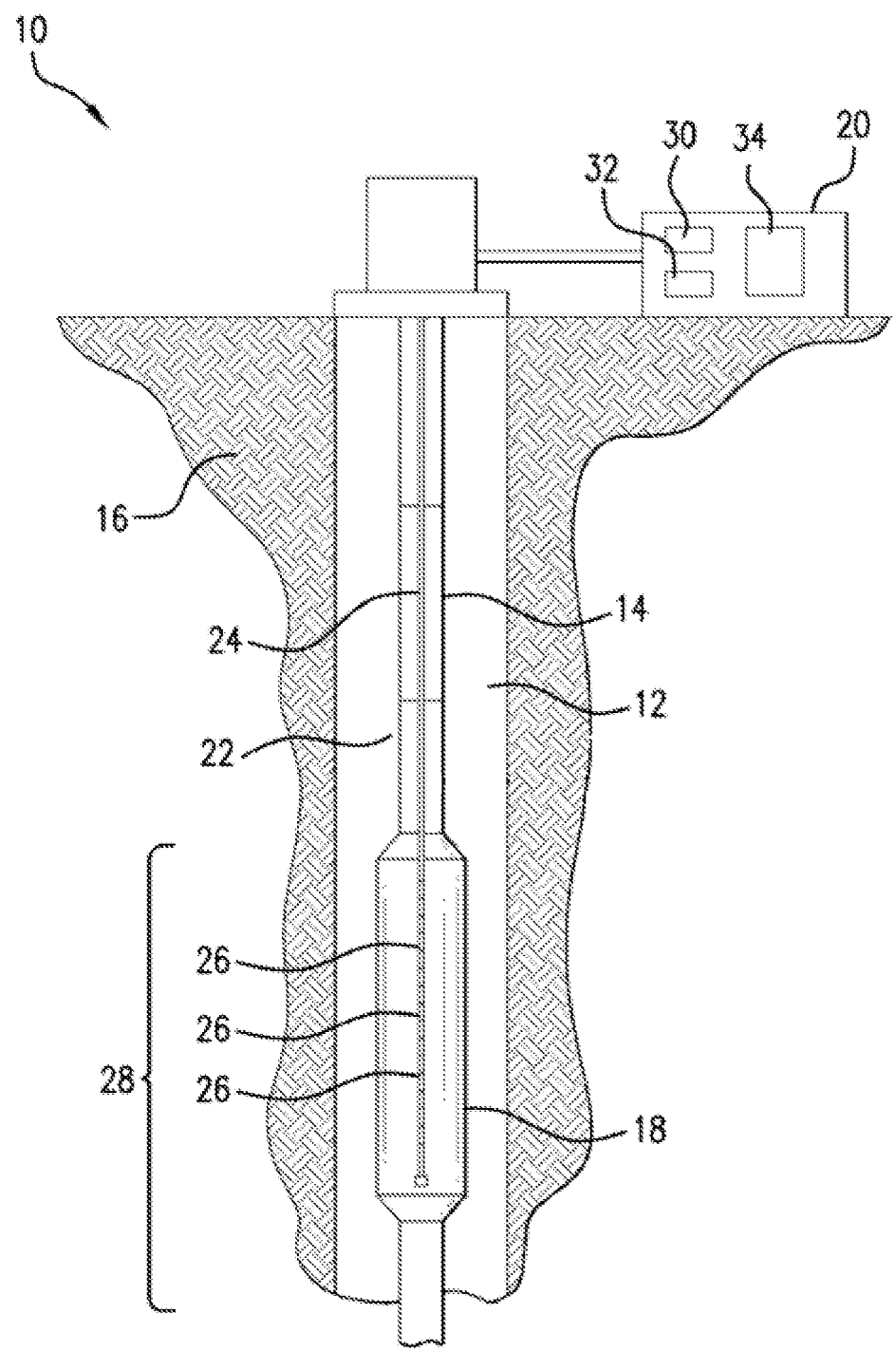
FIG. 1 illustrates an exemplary embodiment of a downhole drilling, monitoring, evaluation, exploration and/or production system.

FIG. 1 shows an exemplary embodiment of a downhole drilling, monitoring, evaluation, exploration and/or production system 10 disposed in a wellbore or borehole 12. A borehole string 14 is disposed in the borehole 12, which penetrates at least one earth formation 16 for performing functions such as extracting matter from the formation and/or making measurements of properties of the formation 16 and/or the wellbore 12 downhole. The borehole string 14 is made from, for example, a pipe, multiple pipe sections or flexible tubing. The system 10 and/or the borehole string 14 include any number of downhole tools 18 for various processes including drilling, hydrocarbon production, and measuring one or more physical quantities in or around a borehole. Various measurement tools 18 may be incorporated into the system 10 to affect measurement regimes such as wireline measurement applications or logging-while-drilling (LWD) applications.

In one embodiment, at least part of the system 10 is configured as a measurement system that includes an optical interrogation assembly or measurement unit 20 connected in operable communication with at least one optical fiber sensing assembly 22. The measurement unit 20 may be located, for example, at a surface location, a subsea location and/or a surface location on a marine well platform or a marine craft. The measurement unit 20 may also be incorporated with the borehole string 12, tool 18 or other carrier, or otherwise disposed downhole as desired. The optical fiber sensing assembly 22 is operably connected to the measurement unit 20 and is configured to be disposed downhole. The optical fiber assembly 22 includes at least one optical fiber 24 configured to take a measurement or multiple measurements (e.g., distributed measurements) of a downhole parameter. The measurement system may be used to measure one or more of various parameters in and around the borehole, such as temperature, pressure, strain, vibration, fluid properties and others.

At least a portion of the optical fiber sensor 24 is disposed on or in relation to a carrier such as a drill string segment, downhole tool or bottomhole assembly. It is noted that a "carrier," as used herein, refers to any structure suitable for being lowered into a wellbore or for connecting a drill or downhole tool to the surface, and is not limited to the structure and configuration described herein. Examples of carriers include casing pipes, coiled tubing, production tubing, wirelines, wireline sondes, slickline sondes, drop shots, downhole subs, BHA's, drill string inserts, modules, internal housings and substrate portions thereof.

The optical fiber 24 includes one or more sensing locations 26 disposed along a length of the optical fiber 24, which are configured to reflect and/or scatter optical interrogation signals transmitted by the measurement unit 20. Examples of sensing locations 26 include locations of intrinsic scattering such as Rayleigh scattering, Brillouin scattering and Raman scattering locations, and optical Fiber Bragg Gratings (FBGs) deliberately written in the fiber.

In one embodiment, a length of the optical fiber sensing assembly 22 defines a measurement region 28 along which distributed parameter measurements may be taken. For example, the measurement region 28 extends along a length of the assembly that includes sensing locations 26. The measurement region 28 may correspond to the length of a tool or other component, or extend along the entire string or along one or more portions of the string.

The measurement unit 20 includes, for example, one or more electromagnetic signal sources 30 such as a tunable light source, a LED and/or a laser, and one or more signal detectors 32 (e.g., photodiodes). Signal processing electronics may also be included in the measurement unit 20, for processing the signals received at the detectors 32. In one embodiment, a processing unit 34 is in operable communication with the signal source 30 and the detector 32 and is configured to control the source 30, receive reflected signal data from the detector 32 and/or process reflected signal data.

In one embodiment, the system 10 is configured as a distributed optical fiber sensing system, such as an acoustic sensing (DAS) system, for measuring or estimating properties or parameters such as fluid flow, pressure, temperature, string and/or tool vibrations, seismic events, and acoustic vibrations along the borehole 12, the tool 18 and/or other downhole components. The sensing system includes the signal source 30, which is configured to emit coherent signal pulses (e.g., laser pulses) and measure reflected signals based on Rayleigh scattering from scattering locations 26 in the sensing region 28 of the optical fiber.

In one embodiment, the sensor assembly employs coherent or phase optical time domain reflectometry (φ-OTDR). In φ-OTDR-based sensors, the optical signal launched into an optical fiber is at least partially coherent, e.g., the coherence length of pulsed signals emitted is longer than the pulse length. Pulses of light from an electromagnetic source (e.g., laser) are launched into an optical fiber, which naturally undergoes Rayleigh scattering as they propagate down the fiber and light scattering from different sections of the fiber can interfere with each other. By looking at phase changes in backscattered signals, changes in the optical path length within the fiber can be estimated and correlated with parameters such as temperature, strain, pressure and acoustic effects.

The φ-OTDR assembly operates by firing a relatively narrow linewidth laser (e.g., a linewidth of less than about 1.0 nm) into a fiber and then measuring the coherent Rayleigh backscatter produced. This coherent Rayleigh scatter is an interferometric signal produced by backscatter sites that are frozen into the fiber during its production. This coherent Rayleigh backscatter essentially turns each section of the fiber into a several meter long interferometer which is sensitive to tiny strain perturbations (nano-strains are typically measured) and also tiny thermal effects due to the thermo-optic coefficient (change in index of refraction per C) and the coefficient of thermal expansion of the optical fiber constituent material (e.g., fused silica).

In one embodiment, the optical fiber 24 is a hydrogen resistant fiber having a pure silica core. As described herein, a "pure silica" core refers to an optical fiber core that is at least substantially made only from silica, or at least a core that has not been doped with an index-raising dopant such as germanium or phosphorous. An exemplary optical fiber having a hydrogen resistant core is Baker Hughes' CoreBright$^{SM}$ fiber. As many index-raising dopants have been discovered to increase hydrogen absorption and lead to increased transmission losses, an optical fiber having a pure silica core and lacking index-raising dopants presents increased resistance to hydrogen absorption.

Figure 2:
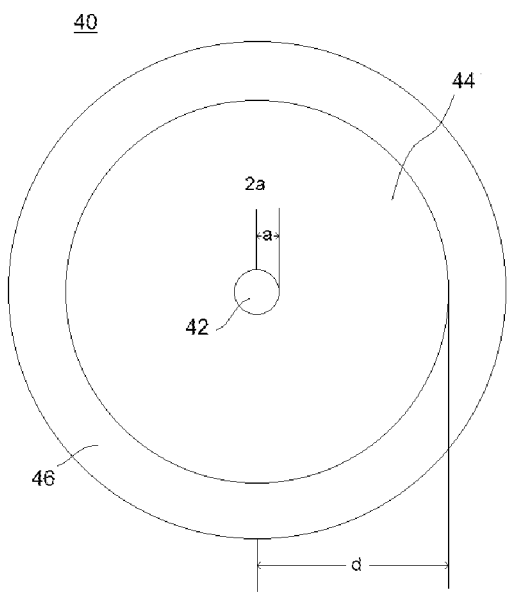
FIG. 2 is a cross-sectional view of an embodiment of an optical fiber.

FIG. 2 depicts an example of a pure silica core single mode optical fiber 40 that can be used as part of a downhole measurement system (e.g., as the optical fiber 24 of the system 10). The optical fiber 40 has a radius d, and includes a core 42 having a radius a and a cladding 44. A central region of the optical fiber 40, which may include all of the core 42 or a portion thereof, is made of at least substantially pure silica. An outer region of the optical fiber is doped with fluorine or other suitable dopants to lower the refractive index of the outer region relative to the central region. The optical fiber 40 may also include an outer layer 46, such as a jacket.

During φ-OTDR measurements, a narrow linewidth laser including a selected wavelength is launched into the optical fiber. For example, a typical wavelength used is 1550 nm. Other wavelengths that can be used include, e.g., 1535 nm, 1565 and 1570 nm wavelengths. As laser sources are not perfectly monochromatic, the optical signal has a linewidth centered around the selected wavelength, e.g., 1540-1560 nm or 1530 nm-1580 nm. Operating wavelengths including these examples may be employed in conjunction with embodiments described herein, but are not so limited.

Single mode fibers can be effectively used for DAS and other distributed measurements, and are useful in downhole environments as they can be connected to available fibers or take advantage of fibers already installed in a borehole string. In order to have a maximum signal-to-noise ratio (SNR), it is desirable to interrogate with optical signals having high power. However, typical single mode fibers impose a limit on the maximum laser power that can be applied, due to non-linear optical effects that occur at high powers. The main non-linear optical effect that limits performance is modulation instability. This is a non-linear effect that causes a spectral broadening of the laser signal followed by the laser signal being broken up into a train of pulses. This broadening of the laser spectrum causes signal fading that can compromise or destroy the ability to measure acoustics downhole.

Because optical signals are not monochromatic, pulses launched into the optical fiber include multiple wavelength components traveling at different speeds, which causes the pulses to spread. This phenomenon is referred to as chromatic dispersion, and is a significant contributor to modulation instability. The chromatic dispersion of a fiber is expressed as, e.g., time spreading in picoseconds (ps) for a source with a spectral width of 1 nm traveling on 1 km of the fiber, i.e., ps/(nm*km).

In one embodiment, an optical fiber, such as the optical fiber 24 and/or 40, has an index profile that causes a shift in chromatic dispersion characteristics relative to conventional single mode optical fibers. Such an optical fiber is referred to as a dispersion-shifted optical fiber. A dispersion-shifted optical fiber can be defined as an optical fiber having a refractive index profile that causes the wavelength at which zero dispersion occurs to be shifted from the natural wavelength at which zero dispersion occurs (e.g., about 1300 nm in pure silica) to a different wavelength. The index profile can be configured to shift the zero dispersion wavelength from about 1300 nm to a wavelength of the optical signal. For example, the fiber dispersion zero wavelength can be shifted from 1300 nm to about 1550 nm.

Figure 3:
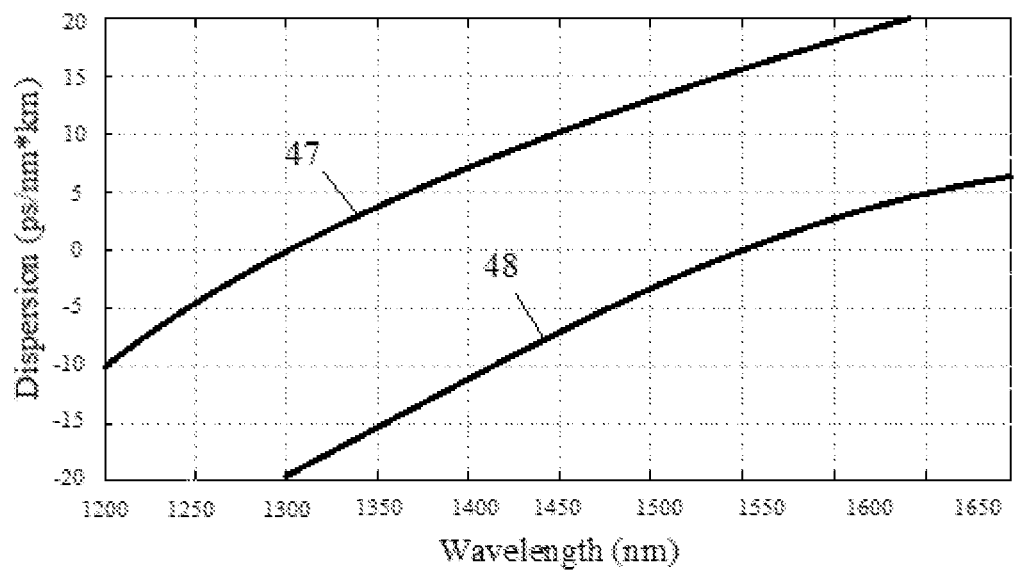
FIG. 3 is a graph depicting dispersion characteristics of a conventional pure silica core optical fiber, and dispersion characteristics of a pure silica core optical fiber having a refractive index profile configured to shift dispersion characteristics according to embodiments discussed herein.

FIG. 3 illustrates dispersion characteristics of a conventional (non-dispersion-shifted) pure core optical fiber, and dispersion characteristics of a pure core optical fiber having an index profile according to embodiments discussed herein. The graph in FIG. 3 shows a dispersion curve 47 of the conventional optical fiber, in comparison with a dispersion curve 48 of a dispersion shifted optical fiber. The index profile of the dispersion shifted optical fiber in this example has a central core region having an index of pure silica and a reduced index outer region (in an outer region of the core, a region of the cladding or in regions of the core and the cladding). The difference in index between the central core region and the outer region is selected so that zero dispersion occurs at about 1550 nm. It is noted that other index profiles can be created to achieve the dispersion characteristics of this example, as discussed further below.

The index can be configured to shift dispersion based on the operating wavelength or beyond the operating wavelength (about 1550 nm in the above example). In addition, the index can be configured to change dispersion characteristics to change the sign of the operating wavelength. For example, the index profile shown in FIG. 3 can be further shifted (e.g., by changing the index difference between the central core region and the outer region) to change the sign of dispersion at about 1550 nm from positive to negative.

Figure 4:
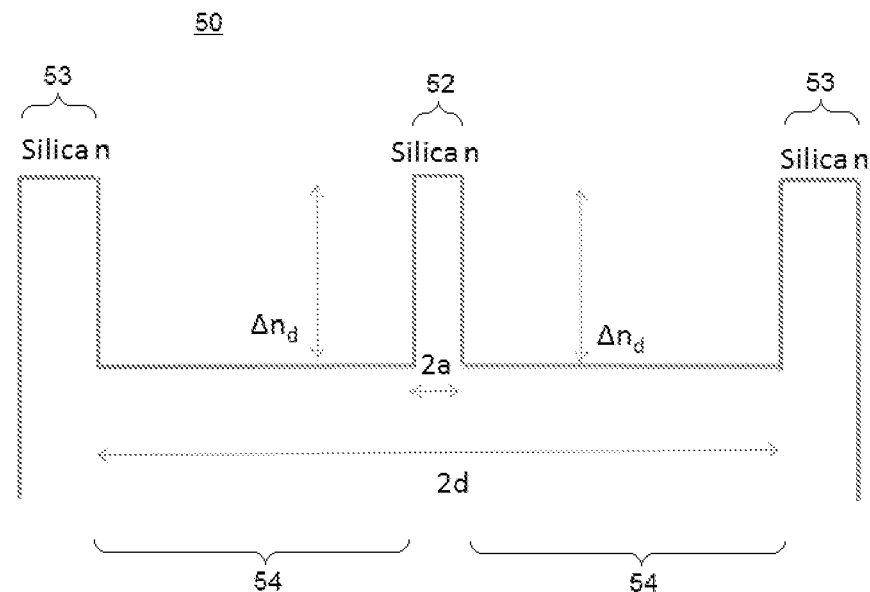
FIG. 4 depicts an example of a refractive index profile configured to shift dispersion characteristics according to embodiments described herein.
Figure 5:
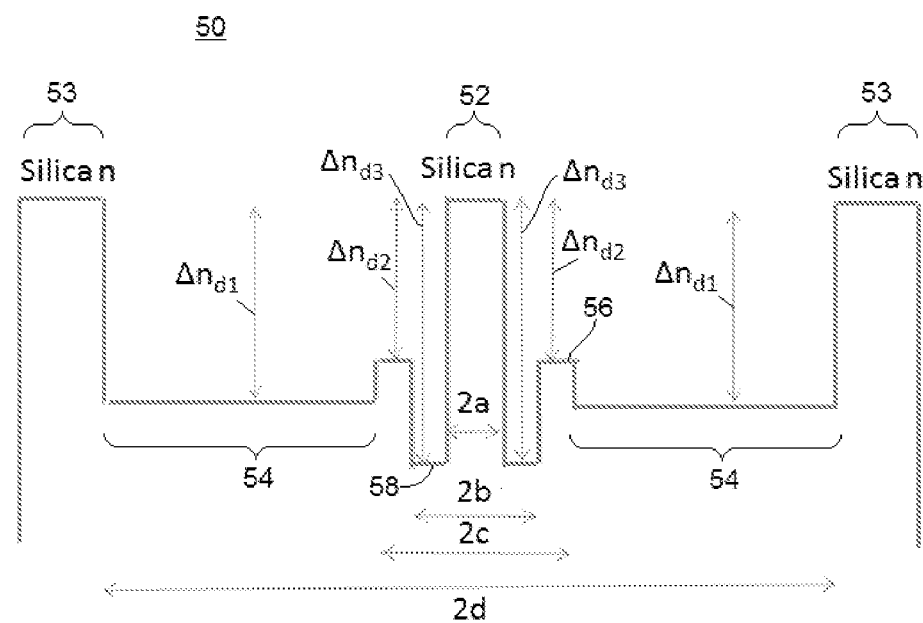
FIG. 5 depicts another example of a refractive index profile configured to shift dispersion characteristics according to embodiments described herein.

FIGS. 4 and 5 illustrate examples of a refractive index profile 50 that can be incorporated into an optical fiber such as the optical fiber 24 and/or 40. In these examples, the index profile includes a profile section 52 of an inner region of the optical fiber (including all or part of the core), which is made of pure silica and has a refractive index n that corresponds to that of silica, i.e., about 1.44 at 1550 nm. Outer profile sections 54 correspond to an outer region of the optical fiber, which is downdoped so that the profile 50 includes a region of lower refractive index than that of silica. The region(s) of lower refractive index can be accomplished by doping the region(s) with a single concentration of dopant (e.g., for step-index) or a varying concentration of dopant (e.g., for graded index or ring profiles). A typical dopant to lower the index of refraction in this region is Fluorine. These profile examples include an outer region 53 that is also pure silica. The outer region 53 may be pure silica because processes that deposit dopant inside a tube to make a fiber typically start with a pure silica tube. However, it should be realized that this region 53 could also be of a lower index or higher index depending on the process used to make the fiber.

In each of these examples, the optical fiber is a single mode fiber that fulfills the following formula:

$$V = \frac{2\pi a NA}{\lambda} = \frac{2\pi a \sqrt{2n\Delta n}}{\lambda} < 2.405,$$

where V is a dimensionless value related to the optical frequency, NA is the numerical aperture of the fiber, and λ is the wavelength of an optical signal. In these examples, n is the refractive index of a core region (all or at least a portion of the core) that is pure silica, and Δn is the relative index difference between the core region and the cladding (or outer region).

The index profile 50 defines an index difference $\Delta n_d$ that represents the difference between the index of refraction of the core region and the outer region. The value of $\Delta n_d$ is selected so that the wavelength at which zero dispersion occurs (the zero dispersion wavelength) is different than the natural zero dispersion wavelength of silica. The value of $\Delta n_d$, in one embodiment, has a magnitude that is sufficient to shift the zero dispersion wavelength to a wavelength that is greater than the wavelength selected for interrogating the optical fiber.

The structure of an optical fiber and the design of the index profile have an impact on signal loss due to leakage of light into the cladding as well as whether the fiber is single-mode according to the V number calculation. Thus, in one embodiment, the size of the core and cladding are selected to reduce or eliminate such leakage so that the overall diameter of the fiber is large enough relative to the diameter of the core region. The relative diameters may be selected based on considerations including the index difference and the wavelengths of an optical signal launched into the optical fiber. The overall diameter of the optical fiber may be selected to be significantly larger than the diameter of the core (or at least the pure silica portion of the core), i.e., 2d>>2a. For example the overall diameter (2a) is selected to be about five times larger than the diameter 2d. As an example, to shift the zero dispersion wavelength to above 1550 nm, the index profile includes an index difference $\Delta n_d$ that is greater than about 1% of the index of refraction of pure silica (above about 0.015), and the core region radius is less than about 2.85 microns.

It is noted that the refractive index profile is not limited to step-index profile, but can have any profile that has an index difference sufficient to cause dispersion shifting or is otherwise designed to cause dispersion shifting. Examples of profiles that can have modified dispersion properties include index profiles with graded edges or additional index depressions outside of a step index core region.

FIG. 5 depicts an example of the refractive index profile 50 configured as a "W" or ring profile. In this example, the section 54 is an outer section, the profile 50 includes an intermediate section (a "ring") formed by a section 56 having an index of refraction that is between the index of section 52 and the index of section 54. The ring thus has a difference ($\Delta n_{d2}$) between the index of refraction of the center section 54 and the section 56 that is less than a difference ($\Delta n_{d1}$) between the index of refraction of the center section 54 and the outer section 54. The ring may also include a section 58 having an index that is less than the index of the outer section 54, so that the ring also includes a difference ($\Delta n_{d3}$) between the index of refraction of the center section 54 and the section 58 that is greater than the differences $\Delta n_{d1}$ and $\Delta n_{d2}$. It is noted that, although only one intermediate section or ring is shown, the profile 50 may have multiple rings.

Dispersion can be characterized as "normal dispersion" or "anomalous dispersion." Normal dispersion is defined as dispersion where the group velocity of an optical signal decreases with increasing optical frequency, which occurs for most transparent media in the visible spectral region. Anomalous dispersion can occur at longer wavelengths. For example, anomalous dispersion can occur in silica at wavelengths longer than the zero-dispersion wavelength of about 1300 nm. Modulation instability can occur when an optical signal includes a wavelength that experiences anomalous dispersion.

In one embodiment, the refractive index profile is configured so that the optical signal wavelengths do not experience anomalous dispersion. For example, in a typical pure silica core single mode fiber used for distributed sensing, where the optical signal includes a wavelength of 1550 nm, the zero dispersion wavelength is at about 1300 nm, which results in anomalous dispersion at 1550 nm. By tailoring the structure of the refractive index profile, the wavelength associated with anomalous dispersion can be shifted from 1550 nm to a greater wavelength, and thereby increase the threshold for modulation instability.

In one embodiment, the refractive index profile in configured to shift the zero dispersion wavelength so that the wavelength selected for interrogation (e.g., the center wavelength of the linewidth of the optical signal) experiences normal dispersion. For example, the index difference $\Delta n_d$ has a magnitude (e.g., greater than 0.015) sufficient to shift the zero dispersion wavelength to about 1770 nm, which results in wavelengths having negative normal dispersion including 1550 nm.

Embodiments described herein may be used in conjunction with methods for estimating various parameters of a borehole environment, which can include parameters of a formation, borehole parameters (e.g., borehole geometry and trajectory, downhole fluids, etc.) and parameters of downhole components. For example, a method includes disposing the optical fiber 24 downhole, launching a pulsed optical signal from the signal source 30 and propagating the optical signal through the optical fiber 24. Reflected or backscattered signals (e.g., from Rayleigh backscatter) are detected and analyzed to estimate parameters such as temperature, pressure, strain and acoustic properties.

Various actions can be performed based on the measurements of downhole parameters. Such actions include, for example, displaying information (e.g., as a profile or log) to a device or user, determining downhole conditions, and adjusting operational parameters of the downhole operation. Other actions include, for example, adjustment of operational parameters such as drilling parameters (e.g., weight on bit, rate of penetration, fluid pumping rate) and stimulation or production parameters (injection flow rate, production flow rate, etc.). The adjustment may be performed by a processor or controller (e.g., the interrogation unit 20) receiving temperature data), a human operator or both.

Set forth below are some embodiments of the foregoing disclosure:

Embodiment 1

A system for performing measurements in a downhole environment, the system including: an optical interrogation assembly configured to emit a pulsed optical signal, the pulsed optical signal including a selected wavelength; and an optical fiber configured to be disposed in a borehole in an earth formation and configured to receive the pulsed optical signal, the optical fiber having at least one measurement location disposed therein and configured to at least partially reflect the pulsed optical signal, the optical fiber having core and a cladding, at least a portion of the core made from at least substantially pure silica, the optical fiber having a refractive index profile configured to have a zero dispersion wavelength that is greater than the selected wavelength.

Embodiment 2

The system of any prior embodiment, further comprising a processing device configured to receive measurement data indicative of reflected signals from the optical fiber and estimate a parameter of the downhole environment based on the measurement data.

Embodiment 3

The system of any prior embodiment, wherein the core is a single mode core.

Embodiment 4

The system of any prior embodiment, wherein the optical fiber includes a core region in at least a portion of the core and an outer region surrounding the core region, the outer region having an index of refraction that is less than an index of refraction of the core region.

Embodiment 5

The system of any prior embodiment, wherein a difference between the index of refraction of the core region and the index of refraction of the outer region has a magnitude sufficient to cause the zero dispersion wavelength to be greater than the selected wavelength.

Embodiment 6

The system of any prior embodiment, wherein a difference between the index of refraction of the core region and the index of refraction of the outer region is at least about 0.015.

Embodiment 7

The system of any prior embodiment, wherein the refractive index profile is configured to cause normal dispersion at the selected wavelength.

Embodiment 8

The system of any prior embodiment, wherein the selected wavelength is about 1550 nm, and the zero dispersion wavelength is about 1770 nm.

Embodiment 9

The system of any prior embodiment, wherein the refractive index profile is a step-index profile in which the core region has a first index of refraction, the first index of refraction having a constant value, and the outer region has a second index of refraction that is less than the first constant index of refraction.

Embodiment 10

The system of any prior embodiment, wherein the outer region includes at least one intermediate region having a third index of refraction that is less than the first index of refraction and greater than the second index of refraction.

Embodiment 11

A method of performing measurements in a downhole environment, the method comprising: disposing at least a length of an optical fiber in a borehole in an earth formation, the optical fiber having at least one measurement location disposed therein and configured to at least partially reflect an optical signal having a selected wavelength, the optical fiber having core and a cladding, at least a portion of the core made from at least substantially pure silica, the optical fiber having a refractive index profile configured to have a zero dispersion wavelength that is greater than the selected wavelength; and transmitting a pulsed optical signal into the optical fiber, the pulsed optical signal including the selected wavelength, and detecting a return signal due to Rayleigh scattering in the optical fiber; and estimating a parameter of the downhole environment based on the return signal.

Embodiment 12

The method of any prior embodiment, wherein the core is a single mode core.

Embodiment 13

The method of any prior embodiment, wherein the optical fiber includes a core region in at least a portion of the core and an outer region surrounding the core region, the outer region having an index of refraction that is less than an index of refraction of the core region.

Embodiment 14

The method of any prior embodiment, wherein a difference between the index of refraction of the core region and the index of refraction of the outer region has a magnitude sufficient to cause the zero dispersion wavelength to be greater than the selected wavelength.

Embodiment 15

The method of any prior embodiment, wherein a difference between the index of refraction of the core region and the index of refraction of the outer region is at least about 0.015.

Embodiment 16

The method of any prior embodiment, wherein the refractive index profile is configured to cause normal dispersion at the selected wavelength.

Embodiment 17

The method of any prior embodiment, wherein the selected wavelength is about 1550 nm, and the zero dispersion wavelength is about 1770 nm.

Embodiment 18

The method of any prior embodiment, wherein the refractive index profile is a step-index profile in which the core region has a first index of refraction, the first index of refraction having a constant value, and the outer region has a second index of refraction that is less than the first constant index of refraction.

Embodiment 19

The method of any prior embodiment, wherein the outer region includes at least one intermediate region having a third index of refraction that is less than the first index of refraction and greater than the second index of refraction.

Embodiment 20

The method of any prior embodiment, wherein the return signal is based on Rayleigh scattering in the optical fiber.

In connection with the teachings herein, various analyses and/or analytical components may be used, including digital and/or analog subsystems. The system may have components such as a processor, storage media, memory, input, output, communications link (wired, wireless, pulsed mud, optical or other), user interfaces, software programs, signal processors and other such components (such as resistors, capacitors, inductors, etc.) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user, or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A system for performing measurements in a downhole environment, the system comprising:
an optical interrogation assembly configured to emit a pulsed optical signal at an operating wavelength with an optical power that cause a non-linear spectral broadening about the operating wavelength; and
an optical fiber configured to be disposed in a borehole in an earth formation and configured to receive the pulsed optical signal, the optical fiber having at least one measurement location disposed therein and configured to at least partially reflect the pulsed optical signal, the optical fiber having a core entirely of pure silica and a cladding of doped silica, the optical fiber having a refractive index profile configured to have a zero dispersion wavelength for chromatic dispersion that is greater than the operating wavelength in order to reduce the non-linear spectral broadening of the pulsed optical signal in the optical fiber in order to transmit the pulse optical signal through the optical fiber at the optical power.

2. The system of claim 1, further comprising a processing device configured to receive measurement data indicative of reflected signals from the optical fiber and estimate a parameter of the downhole environment based on the measurement data.

3. The system of claim 1, wherein the core is a single mode core.

4. The system of claim 1, wherein the optical fiber includes a core region in at least a portion of the core and an outer region surrounding the core region, the outer region having an index of refraction that is less than an index of refraction of the core region.

5. The system of claim 4, wherein a difference between the index of refraction of the core region and the index of refraction of the outer region has a magnitude sufficient to cause the zero dispersion wavelength to be greater than the selected wavelength.

6. The system of claim 5, wherein a difference between the index of refraction of the core region and the index of refraction of the outer region is at least about 0.015.

7. The system of claim 1, wherein the refractive index profile is configured to cause normal dispersion at the selected wavelength.

8. The system of claim 1, wherein the selected wavelength is about 1550 nm, and the zero dispersion wavelength is about 1770 nm.

9. The system of claim 1, wherein the refractive index profile is a step-index profile in which the core region has a first index of refraction, the first index of refraction having a constant value, and the outer region has a second index of refraction that is less than the first constant index of refraction.

10. The system of claim 9, wherein the outer region includes at least one intermediate region having a third index of refraction that is less than the first index of refraction and greater than the second index of refraction.

11. A method of performing measurements in a downhole environment, the method comprising:
disposing at least a length of an optical fiber in a borehole in an earth formation, the optical fiber having at least one measurement location disposed therein and configured to at least partially reflect an optical signal having a selected wavelength, the optical fiber having a core entirely of pure silica and a cladding of doped silica, the optical fiber having a refractive index profile configured to have a zero dispersion wavelength for chromatic dispersion that is greater than the selected wavelength in order to reduce a non-linear spectral broadening of an optical signal in the optical fiber; and
transmitting a pulsed optical signal into the optical fiber at an operating wavelength with an optical power that causes a non-linear spectral broadening about the operating wavelength, wherein the optical fiber reduces the non-linear spectral broadening of the pulsed optical signal to transmit the pulse optical signal through the optical fiber at the optical power, and detecting a return signal due to Rayleigh scattering in the optical fiber; and
estimating a parameter of the downhole environment based on the return signal.

12. The method of claim 11, wherein the core is a single mode core.

13. The method of claim 11, wherein the optical fiber includes a core region in at least a portion of the core and an outer region surrounding the core region, the outer region having an index of refraction that is less than an index of refraction of the core region.

14. The method of claim 13, wherein a difference between the index of refraction of the core region and the index of refraction of the outer region has a magnitude sufficient to cause the zero dispersion wavelength to be greater than the selected wavelength.

15. The method of claim 14, wherein a difference between the index of refraction of the core region and the index of refraction of the outer region is at least about 0.015.

16. The method of claim 11, wherein the refractive index profile is configured to cause normal dispersion at the selected wavelength.

17. The method of claim 11, wherein the selected wavelength is about 1550 nm, and the zero dispersion wavelength is about 1770 nm.

18. The method of claim 11, wherein the refractive index profile is a step-index profile in which the core region has a first index of refraction, the first index of refraction having a constant value, and the outer region has a second index of refraction that is less than the first constant index of refraction.

19. The method of claim 18, wherein the outer region includes at least one intermediate region having a third index of refraction that is less than the first index of refraction and greater than the second index of refraction.

20. The method of claim 11, wherein the return signal is based on Rayleigh scattering in the optical fiber.

* * * * *